US011131207B1

(12) United States Patent
Farris et al.

(10) Patent No.: US 11,131,207 B1
(45) Date of Patent: Sep. 28, 2021

(54) SEMI-AUTONOMOUS RAPID RESPONSE ACTIVE CLEARANCE CONTROL SYSTEM

(71) Applicant: Raytheon Technologies Corporation, Farmington, CT (US)

(72) Inventors: John R. Farris, Lebanon, CT (US); Michael G. McCaffrey, Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/864,765

(22) Filed: May 1, 2020

(51) Int. Cl.
*F01D 11/22* (2006.01)

(52) U.S. Cl.
CPC .......... *F01D 11/22* (2013.01); *F05D 2240/55* (2013.01)

(58) Field of Classification Search
CPC ........ F01D 11/22; F01D 5/12; F05D 2220/32; F05D 2240/11; F05D 2240/30
See application file for complete search history.

(56) References Cited

U.S. PATENT DOCUMENTS 8,939,715 B2 1/2015 Miller
10,323,536 B2 6/2019 Hill
10,364,696 B2 * 7/2019 Virkler .................. F04D 29/526
10,400,620 B2 9/2019 Ribarov et al.
2013/0209240 A1 * 8/2013 McCaffrey ............. F01D 11/20 415/173.2
2014/0310876 A1 * 10/2014 Roussy .................... A61G 7/07 5/613
2016/0333721 A1 * 11/2016 McCaffrey ............. F01D 11/22
2018/0038238 A1 * 2/2018 Ribarov .................. F01D 11/22

FOREIGN PATENT DOCUMENTS

EP 1624159 A1 2/2006
EP 3078815 A1 * 10/2016 .......... F04D 29/164

* cited by examiner

*Primary Examiner* — Justin D Seabe
*Assistant Examiner* — Ryan C Clark
(74) *Attorney, Agent, or Firm* — Kinney & Lange, P.A.

(57) ABSTRACT

A semi-autonomous rapid response active clearance control system for a gas turbine engine includes an outer case, a carrier for a blade outer airseal positioned radially inward of the outer case, a blade outer airseal positioned radially inward of and mounted to the carrier, at least one electromechanical actuator attached to the outer case and selectively operable to move the carrier, and a sensing system. The sensing system includes a maneuver sensor housed within the actuator and configured to output a first signal, a position sensor mounted proximate to the blade outer airseal and configured to output a second signal, and a control means in communication with the maneuver sensor and the position sensor.

20 Claims, 3 Drawing Sheets

SEMI-AUTONOMOUS RAPID RESPONSE ACTIVE CLEARANCE CONTROL SYSTEM

BACKGROUND

The disclosed subject matter generally relates to a clearance control system for a gas turbine engine, and more particularly, to a rapid response active clearance control system capable of semi-autonomous operation.

It is desirable to both minimize clearance between a rotor blade tip and a static outer shroud and reduce tip rubbing during engine operation. Various types of active clearance control systems exist to maintain this balance. Current systems can include pneumatic models or those using engine bleed air to control thermal expansion and contraction of casing components. However, pneumatic systems can add extra weight and/or cost that offset the corresponding improvements to engine efficiency, and thermal systems can be slow, particularly during rapid throttle maneuvers.

SUMMARY

A semi-autonomous rapid response active clearance control system for a gas turbine engine includes an outer case, a carrier for a blade outer airseal positioned radially inward of the outer case, a blade outer airseal positioned radially inward of and mounted to the carrier, at least one electromechanical actuator attached to the outer case and selectively operable to move the carrier, and a sensing system. The sensing system includes a maneuver sensor housed within the actuator and configured to output a first signal, a position sensor mounted proximate to the blade outer airseal and configured to output a second signal, and a control means in communication with the maneuver sensor and the position sensor.

A method of maintaining a predetermined clearance between an airfoil tip and a blade outer airseal within a gas turbine engine includes sensing a first parameter using a maneuver sensor, sensing a second parameter using a position sensor, and actuating, using an electromechanical actuator, a lever to adjust a radial position of the blade outer airseal based on the sensed first parameter and the sensed second parameter. The first parameter is a change in velocity or a change in rotation, and the second parameter is a clearance between the blade outer airseal and the airfoil tip.

The present summary is provided only by way of example, and not limitation. Other aspects of the present disclosure will be appreciated in view of the entirety of the present disclosure, including the entire text, claims, and accompanying figures.

Figure 1:
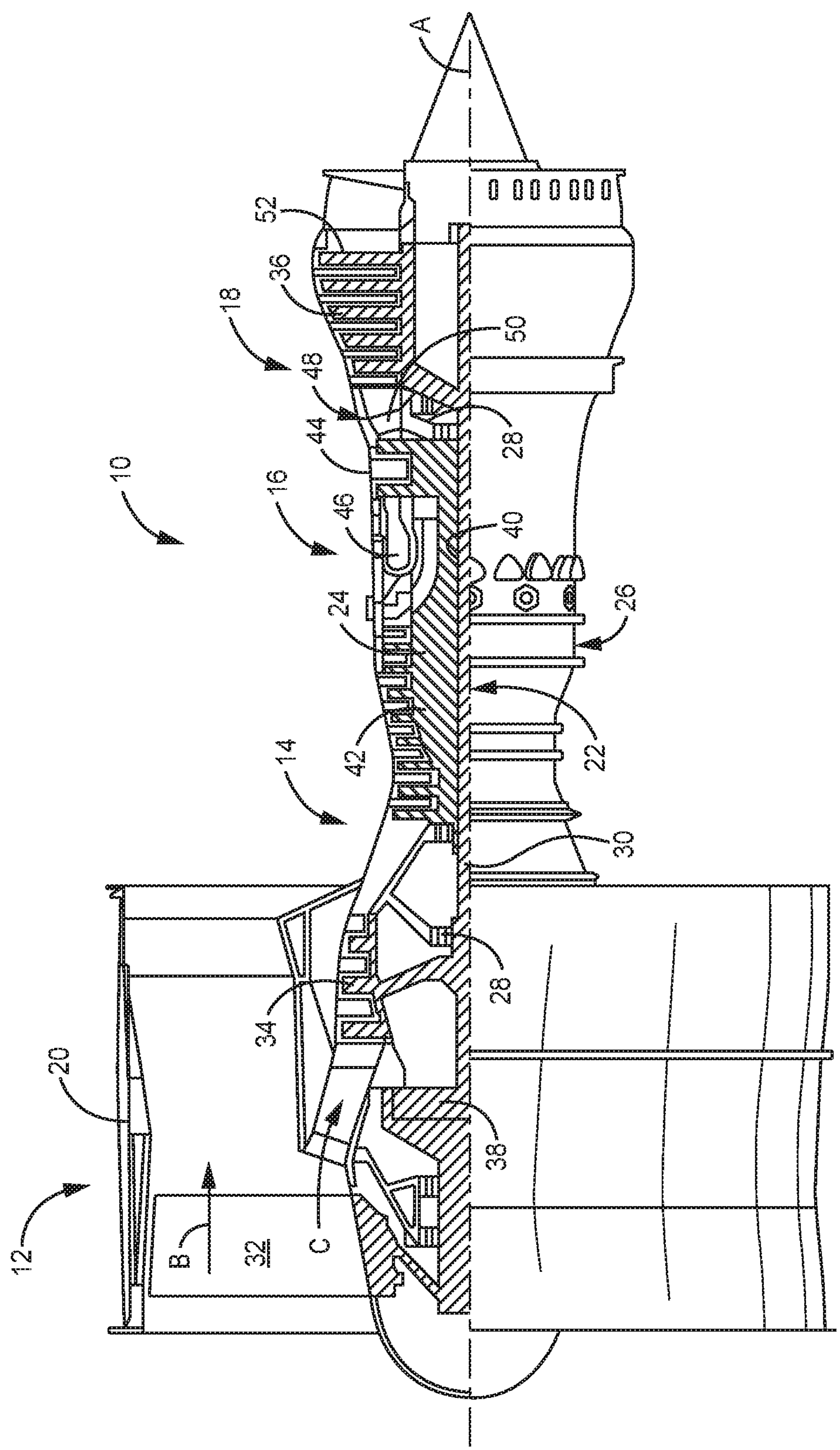
FIG. 1 is a cross-sectional view depicting an exemplary embodiment of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A rapid response clearance control system for a gas turbine engine includes an electromechanical actuator with an embedded sensor for sensing acceleration and/or rotational motion, a remote sensor mounted to an engine static structure for sensing relative movement of the blade outer air seal, and control means for receiving sensor outputs and commanding a corresponding movement of the actuator. The control means can, in one embodiment, be collocated with the actuator. The control means can operate independently of the engine controller to continuously maintain, as necessary, the desired clearance between the blade outer air seal and rotor blade tips throughout the flight envelope.

FIG. 1 schematically illustrates a gas turbine engine 10. The gas turbine engine 10 is disclosed herein as a two-spool turbofan that generally incorporates a fan section 12, a compressor section 14, a combustor section 16 and a turbine section 18. The fan section 12 drives air along a bypass flow path B in a bypass duct defined within a nacelle 20, while the compressor section 14 drives air along a core flow path C for compression and communication into the combustor section 16 then expansion through the turbine section 18. Although depicted as a two-spool turbofan gas turbine engine in the disclosed embodiment, it should be understood that the concepts described herein are not limited to use with two-spool turbofans as the teachings may be applied to other types of turbine engines including three-spool architectures.

The exemplary engine 10 generally includes a low speed spool 22 and a high speed spool 24 mounted for rotation about an engine central longitudinal axis A relative to an engine static structure 26 via several bearing systems 28. It should be understood that various bearing systems 28 at various locations may alternatively or additionally be provided, and the location of bearing systems 28 may be varied as appropriate to the application.

The low speed spool 22 generally includes an inner shaft 30 that interconnects a fan 32, a first (or low) pressure compressor 34 and a first (or low) pressure turbine 36. The inner shaft 30 is connected to the fan 32 through a speed change mechanism, which in exemplary gas turbine engine 10 is illustrated as a geared assembly 38 to drive the fan 32 at a lower speed than the low speed spool 22. The high speed spool 24 includes an outer shaft 40 that interconnects a second (or high) pressure compressor 42 and a second (or high) pressure turbine 44. A combustor 46 is arranged in exemplary gas turbine 10 between the high pressure compressor 42 and the high pressure turbine 44. A mid-turbine frame 48 of the engine static structure 26 is arranged generally between the high pressure turbine 44 and the low pressure turbine 36. The mid-turbine frame 48 further supports bearing systems 28 in the turbine section 18. The inner shaft 30 and the outer shaft 40 are concentric and rotate via bearing systems 28 about the engine central longitudinal axis A which is collinear with their longitudinal axes.

The core airflow is compressed by the low pressure compressor 34 then the high pressure compressor 42, mixed and burned with fuel in the combustor 46, then expanded over the high pressure turbine 44 and low pressure turbine 36. The mid-turbine frame 48 includes airfoils 50 which are in the core airflow path C. The turbines 36, 44 rotationally drive the respective low speed spool 22 and high speed spool 24 in response to the expansion. It will be appreciated that each of the positions of the fan section 12, compressor section 14, combustor section 16, turbine section 18, and fan drive gear system 38 may be varied. For example, gear system 38 may be located aft of combustor section 16 or even aft of turbine section 18, and fan section 12 may be positioned forward or aft of the location of gear system 38.

The engine 10 in one example is a high-bypass geared aircraft engine. In a further example, the engine 10 bypass ratio is greater than about six (6), with an example embodiment being greater than about ten (10), the geared architecture 38 is an epicyclic gear train, such as a planetary gear system or other gear system, with a gear reduction ratio of greater than about 2.3, and the low pressure turbine 36 has a pressure ratio that is greater than about five. In one disclosed embodiment, the engine 10 bypass ratio is greater than about ten (10:1), the fan diameter is significantly larger than that of the low pressure compressor 34, and the low pressure turbine 36 has a pressure ratio that is greater than about five 5:1. Low pressure turbine 36 pressure ratio is pressure measured prior to inlet of low pressure turbine 36 as related to the pressure at the outlet of the low pressure turbine 36 prior to an exhaust nozzle. The geared architecture 38 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 12 of the engine 10 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one embodiment is less than about 1.45. "Low corrected fan tip speed" is the actual fan tip speed in ft/sec divided by an industry standard temperature correction of $[(\text{Tram}^\circ\ \text{R})/(518.7^\circ\ \text{R})]^{0.5}$. The "Low corrected fan tip speed" as disclosed herein according to one embodiment, is less than about 1150 ft/second (350.5 meters/second).

The example gas turbine engine includes fan 32 that comprises in one embodiment, less than about twenty-six (26) fan blades. In another embodiment, fan section 12 includes less than about twenty (20) fan blades. Moreover, in one disclosed embodiment low pressure turbine 36 includes no more than about six (6) turbine rotors schematically indicated at 52. In another example embodiment low pressure turbine 36 includes about three (3) turbine rotors. A ratio between number of fan blades 42 and the number of low pressure turbine rotors is between about 3.3 and about 8.6. The example low pressure turbine 36 provides the driving power to rotate fan section 12 and therefore the relationship between the number of turbine rotors 52 in low pressure turbine 36 and number of blades 32 in fan section 12 provide for an example gas turbine engine 10 with increased power transfer efficiency.

Although the disclosed embodiment depicts a turbofan gas turbine engine, it should be understood that the concepts described herein are not limited to use with turbofans as the teachings may be applied to other types of turbine engines; for example a low-bypass turbine engine, or a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Figure 2:
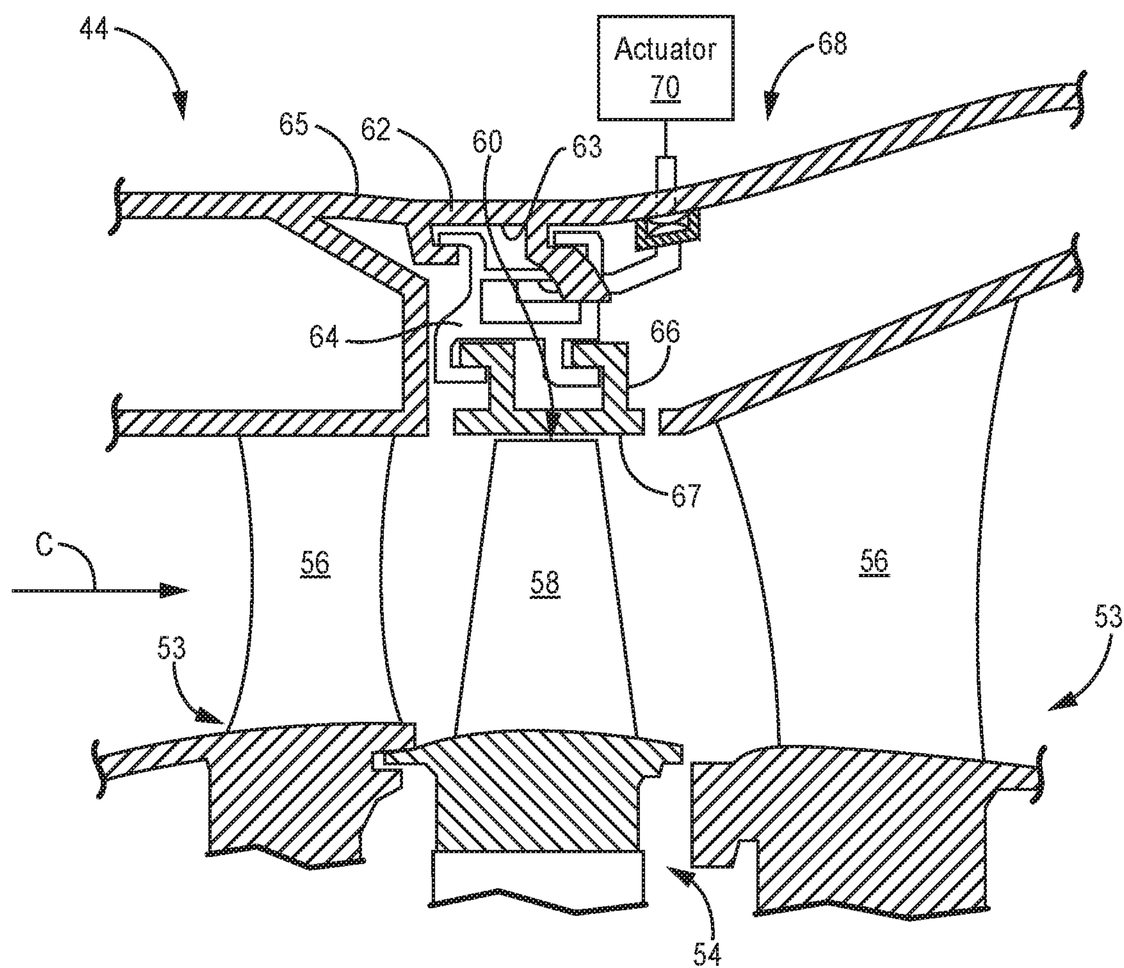
FIG. 2 is a cross-sectional view of a turbine section of the gas turbine engine with a semi-autonomous rapid response active clearance control system.

FIG. 2 is a simplified partial cross-section showing high pressure turbine 44 which includes alternating rows of stator assemblies 53 and rotor assemblies 54 (only one of which is shown). Each stator assembly 53 includes vanes 56 for directing core airflow C and each rotor assembly 54 includes blades 58 for extracting energy from core airflow C. Each blade 58 can include a blade tip 60. High pressure turbine 44 further includes various components positioned radially outward from assemblies 53 and 54 including case 62, carrier 64, and blade outer airseal (BOAS) 66. Beginning at a radially outermost point, case 62 can be an annular structure for housing assemblies 53 and 54. Carrier 64 can be mounted to radially inner side 63 of case 62 by, for example, hooks or other suitable attachment means. BOAS 66 can be positioned radially inward of and mounted to carrier 64, also using hooks or other suitable attachment means. A tip clearance T (labeled in FIG. 3) is the space between inner side 67 of BOAS 66 and blade tip 60. In an exemplary embodiment, BOAS 66 can be arranged as multiple segments forming a ring around rotor assembly 54. In such an embodiment, several BOAS 66 segments can be mounted to a single carrier 64. Similarly, carrier 64 can be a single, annular structure, or arranged as multiple segments. In an alternative embodiment, carrier 64 can be eliminated such that BOAS 66 is mounted directly to inner side 63 of case 62.

High pressure turbine 44 further includes active clearance control system 68 for maintaining a desired tip clearance T between BOAS 66 and blade tip 60. It should be understood by one skilled in the art that one or more clearance control systems 68 can, in alternative embodiments, be installed in various locations within compressor section 14 and/or turbine section 18 of gas turbine engine 10 or other gas turbine engines. Clearance control system 68 includes structural and sealing components of high pressure turbine 44 including case 62, carrier 64, and BOAS 66. Clearance control system 68 further includes one or more actuators 70, and one or more sensing systems 72 (shown in FIG. 3). In FIG. 2, actuator 70 is shown mounted to an outer side 65 of case 62. Actuator 70 can be an electromechanical actuator having an electric drive motor, and can be made from relatively high temperature materials suitable for the operating environment of high pressure turbine 44 or other sections of gas turbine engine 10. In an exemplary embodiment, a number of actuators (e.g., ranging from about 8-20) can be mounted circumferentially around case 62, the exact number depending, for example on the size of gas turbine engine 10, and more specifically, the size and configuration of any of case 62, carrier 64, and BOAS 66. Alternative embodiments can include more or fewer actuators 70, as required for operation of clearance control system 68.

Figure 3:
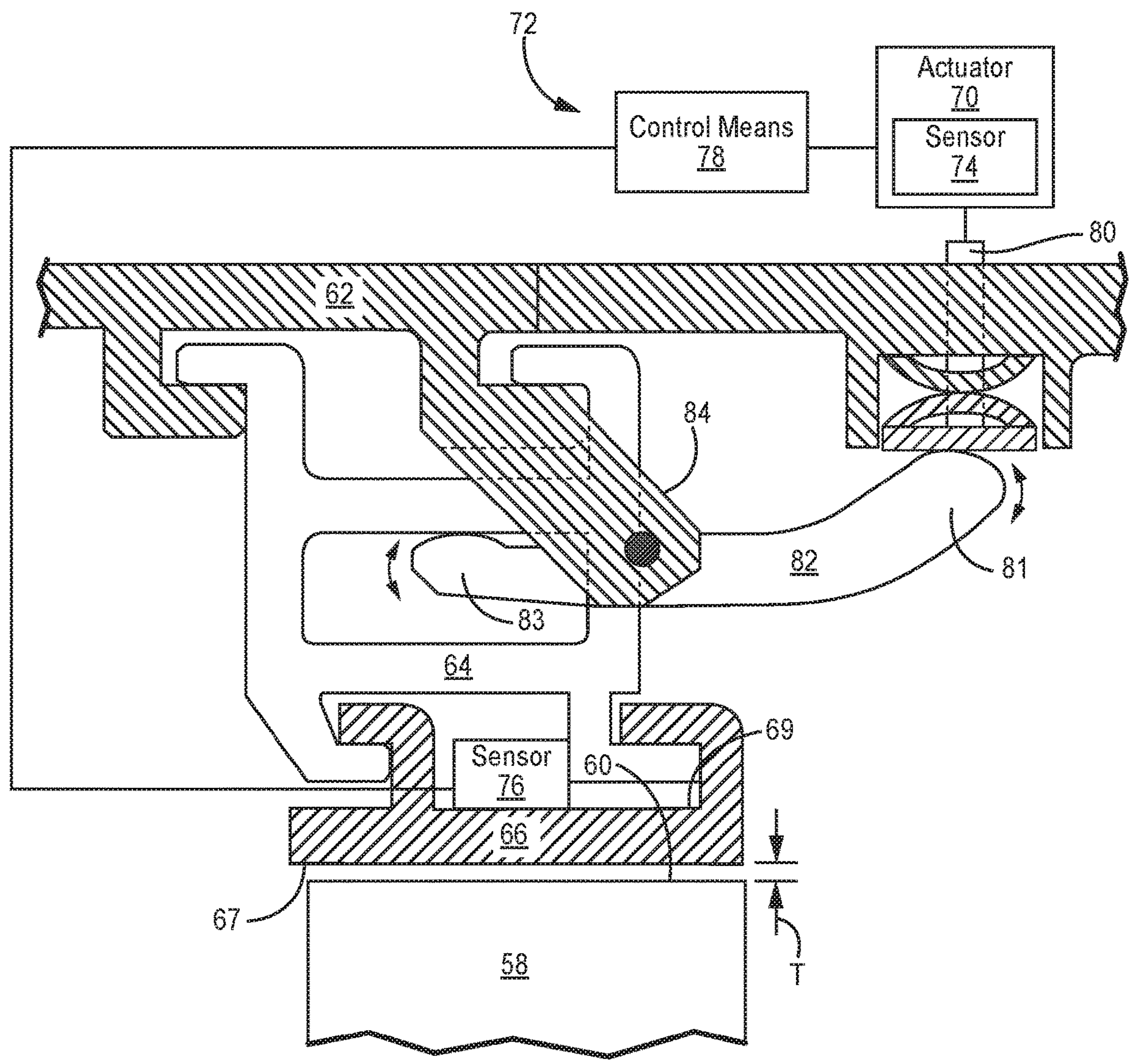
FIG. 3 is an enlarged view of components of the clearance control system of FIG. 2.

FIG. 3 is an enlarged view of components of clearance control system 68 of FIG. 2, including components of sensing system 72. Sensing system 72 includes maneuver sensor 74, position sensor 76, and control means 78. Maneuver sensor 74 can be, for example, a gyroscope or accelerometer (e.g., uni- or multi-axial) used to sense, respectively, rotational motion and acceleration of gas turbine engine 10. As shown in FIG. 3, maneuver sensor 74 is collocated with actuator 70 and more specifically, actuator 70 both houses maneuver sensor 74 and includes the requisite circuitry for supporting functions of maneuver sensor 74. Position sensor 76, as shown, is positioned radially between carrier 64 and BOAS 66, and can be mounted to either structure, depending on factors such as sensor geometry, spatial constraints, etc. In an exemplary embodiment, position sensor 76 is a microwave position sensor for sensing tip clearance T. This parameter can include actual tip clearance or tip clearance derived from a sensed relative radial position of BOAS 66 with respect to a reference point. Position sensor 76 can alternatively be another type of position sensor for sensing tip clearance T. Other suitable locations for each of maneuver sensor 74 and position sensor 76 are contemplated herein.

Control means 78 can be a controller or other suitable control system for receiving output signals representing sensed data from maneuver sensor 74 and position sensor 76 and signaling operation of actuator 70 in response to the sensed data. Control means 78 can include a control logic algorithm with a predetermined value or range of values for tip clearance T, as is discussed below in greater detail. In an exemplary embodiment, control means 78 can be collocated with actuator 70, such as being housed within actuator 70, or being incorporated into a line replaceable unit (LRU) with actuator 70. Control means 78 can also be remotely located based on, for example, thermal or spatial limitations.

With continued reference to FIGS. 2 and 3, rotor assembly 54 is initially positioned such that the desired tip clearance T is present between inner side 67 of BOAS 66 and blade tip 60 during steady state operating conditions of gas turbine engine 10. The value of tip clearance T can change throughout the flight envelope due to changes in engine power (e.g., high or low throttle conditions) causing thermal expansion or contraction, as well as centrifugal forces acting on gas turbine engine 10. Maneuver sensor 74 senses changes in rotation and/or acceleration of gas turbine engine that can be indicative of sudden maneuvering or change in engine power. Control means 78 receives maneuver sensor 74 data as a first output signal. Similarly, position sensor 76 senses changes in the value of tip clearance T which are received by control means 78 as a second output signal. Data from each sensor 74 and 76 can be continuously provided to control means 78, or scheduled if desired. Further, each sensor 74 and 76 can operate independently of the other such that a failure of one does not impact the operation of the other. The sensed data is compared to the model of predetermined tip clearance T values, and control means 78 can adjust, using actuator 70, the position of BOAS 66 as necessary to maintain the desired value of tip clearance T.

As shown in FIG. 3, plunger 80 of actuator 70 is in operational contact with first end 81 of lever 82. Second end 83 of lever 82 is in operational contact with carrier 64. Lever 82 can be connected to projection 84 of case 62 at a point between first end 81 and second end 83 such that lever 82 can pivot about its attachment point. When an adjustment of tip clearance T is required (as indicated by sensor data), control means can signal actuator 70 to extend and retract plunger 80 and cause lever 82 pivot about its attachment point. This causes second end 83 to move carrier 64 and thereby BOAS 66, to which it is attached. BOAS 66 can be moved radially outward or inward in this manner, as required to maintain a desired tip clearance T.

In an exemplary embodiment, active clearance control system 68 is at least semi-autonomous with sensing system 72 operating as a closed loop system. In such an embodiment, control means 78 can operate independently of the full authority digital electronic control (FADEC) (not shown) of gas turbine engine 10. Whereas some existing active clearance control systems are activated by the FADEC based on throttle lever position, a closed loop sensing system 72 can continuously monitor and maintain tip clearance T throughout the flight envelope, instead of only those portions of the flight where the throttle lever position or change of position is sufficient to trigger operation of the clearance control system. This allows for real-time adjustment of tip clearance T and increased efficiency of gas turbine engine 10. In an alternative embodiment, it may be desirable to allow inputs from the FADEC to enhance efficiency of the feedback loop and additionally or alternatively to allow for control means 78 to provide data to the FADEC and airframe as a failsafe feature and/or data-tracking purposes. It should be understood that alternative embodiments can further include various other types, numbers, and/or groupings of actuators, sensors, control means, etc., as required for desired operation of the active clearance control system.

The disclosed active clearance control system has many benefits. It works more quickly than thermal systems and pneumatic systems, as it can sense and adjust tip clearance, in real time. Because it can operate to maintain a desired clearance throughout the flight envelope, it may also obviate the need for rotor stage abradable seal systems. Instead, blade tips and corresponding radially outer static surfaces (e.g., the BOAS) could be coated with suitable high-temperature materials. This could increase the useful life of components while also reducing weight.

DISCUSSION OF POSSIBLE EMBODIMENTS

The following are non-exclusive descriptions of possible embodiments of the present invention.

A semi-autonomous rapid response active clearance control system for a gas turbine engine includes an outer case, a carrier for a blade outer airseal positioned radially inward of the outer case, a blade outer airseal positioned radially inward of and mounted to the carrier, at least one electromechanical actuator attached to the outer case and selectively operable to move the carrier, and a sensing system. The sensing system includes a maneuver sensor housed within the actuator and configured to output a first signal, a position sensor mounted proximate to the blade outer airseal and configured to output a second signal, and a control means in communication with the maneuver sensor and the position sensor.

The system of the preceding paragraph can optionally include, additionally and/or alternatively, any one or more of the following features, configurations and/or additional components:

In the above system, the maneuver sensor can be an accelerometer for sensing a change in velocity.

In any of the above systems, the maneuver sensor can be a gyroscope for sensing a change in rotation.

In any of the above systems, the position sensor can sense a clearance between the blade outer airseal and a rotor blade tip.

In any of the above systems, the position sensor can be a microwave sensor.

In any of the above systems, the position sensor can be mounted radially outward of the blade outer airseal.

In any of the above systems, the control means can include a controller for receiving the first signal and the second signal.

In any of the above systems, the controller can be collocated with the at least one electromechanical actuator.

In any of the above systems, the controller can be configured to signal the at least one electromechanical actuator to actuate a lever in response to at least one of the first signal or the second signal.

In any of the above systems, a first end of the lever can be in operational contact with the at least one electromechanical actuator, and wherein a second end of the lever is in operational contact with the carrier In any of the above systems, the at least one electromechanical actuator can include a plurality of electromechanical actuators.

Any of the above systems can further include a first turbine stage with a plurality of blades rotatable about an engine axis, each of the plurality of blades having a blade body and a tip at a radially outermost extent of the blade body and the above active clearance control system. The active clearance control system can be configured to maintain a predetermined clearance between a radially inner side of the blade outer airseal and the tip of each of the plurality of blades.

A method of maintaining a predetermined clearance between an airfoil tip and a blade outer airseal within a gas turbine engine includes sensing a first parameter using a maneuver sensor, sensing a second parameter using a position sensor, and actuating, using an electromechanical actuator, a lever to adjust a radial position of the blade outer airseal based on the sensed first parameter and the sensed second parameter. The first parameter is a change in velocity or a change in rotation, and the second parameter is a clearance between the blade outer airseal and the airfoil tip.

The method of the preceding paragraph can optionally include, additionally and/or alternatively, any one or more of the following features, configurations and/or additional components:

In the above method, the maneuver sensor can be housed within the electromechanical actuator.

In any of the above methods, the maneuver sensor can be an accelerometer or a gyroscope.

In any of the above methods, the position sensor can be a microwave sensor.

Any of the above methods can further include receiving a first output signal representative of the first parameter using a control means, and receiving a second output signal representative of the second parameter using the control means.

Any of the above methods can further include signaling, using the control means, actuation of the electromechanical actuator based on at least one of the first output signal or the second output signal.

In any of the above methods, data representing the predetermined clearance can be stored within the control means.

In any of the above methods, the control means can be collocated with the electromechanical actuator.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A semi-autonomous rapid response active clearance control system for a gas turbine engine, the active clearance control system comprising:
- an outer case;
- a carrier for a blade outer airseal positioned radially inward of the outer case;
- a blade outer airseal positioned radially inward of and mounted to the carrier;
- at least one electromechanical actuator attached to the outer case and selectively operable to move the carrier; and
- a sensing system comprising:
  - a maneuver sensor housed within the actuator and configured to output a first signal representing a change in at least one of a velocity and a rotation;
  - a position sensor mounted proximate the blade outer airseal and configured to output a second signal; and
  - a control means in communication with the maneuver sensor and the position sensor.

2. The system of claim 1, wherein the maneuver sensor is an accelerometer and the first signal represents a change in velocity.

3. The system of claim 1, wherein the maneuver sensor is a gyroscope and the first signal represents a change in rotation.

4. The system of claim 1, wherein the position sensor senses a clearance between the blade outer airseal and a rotor blade tip.

5. The system of claim 4, wherein the position sensor is a microwave sensor.

6. The system of claim 5, wherein the position sensor is mounted radially outward of the blade outer airseal.

7. The system of claim 1, wherein the control means comprises a controller for receiving the first signal and the second signal.

8. The system of claim 7, wherein the controller is collocated with the at least one electromechanical actuator.

9. The system of claim 7, wherein the controller is configured to signal the at least one electromechanical actuator to actuate a lever in response to at least one of the first signal or the second signal.

10. The system of claim 9, wherein a first end of the lever is in operational contact with the at least one electromechanical actuator, and wherein a second end of the lever is in operational contact with the carrier.

11. The system of claim 1, wherein the at least one electromechanical actuator comprises a plurality of electromechanical actuators.

12. A turbine section of a gas turbine engine comprising:
- a first turbine stage comprising a plurality of blades rotatable about an engine axis;
- each of the plurality of blades comprising a blade body and a tip at a radially outermost extent of the blade body; and
- the active clearance control system of claim 1;
- wherein the active clearance control system is configured to maintain a predetermined clearance between a radially inner side of the blade outer airseal and the tip of each of the plurality of blades.

13. A method of maintaining a predetermined clearance between an airfoil tip and a blade outer airseal within a gas turbine engine, the method comprising:

sensing a plurality of parameters using a closed-loop sensing system independently operable of a full authority digital electronic control of the gas turbine engine, the closed-loop sensing system comprising:

a maneuver sensor configured to sense a first parameter;

a position sensor configured to sense a second parameter; and actuating, using an electromechanical actuator, a lever to adjust a radial position of the blade outer airseal based on the sensed first parameter and the sensed second parameter;

wherein the first parameter is a change in velocity or a change in rotation, and the second parameter is a clearance between the blade outer airseal and the airfoil tip.

14. The method of claim 13, wherein the maneuver sensor is housed within the electromechanical actuator.

15. The method of claim 13, wherein the maneuver sensor is an accelerometer or a gyroscope.

16. The method of claim 13, wherein the position sensor is a microwave sensor.

17. The method of claim 13 and further comprising:

receiving, using a control means, a first output signal representative of the first parameter; and receiving, using the control means, a second output signal representative of the second parameter.

18. The method of claim 17 and further comprising: signaling, using the control means, actuation of the electromechanical actuator based on at least one of the first output signal or the second output signal.

19. The method of claim 17, wherein data representing the predetermined clearance is stored within the control means.

20. The method of claim 17, wherein the control means is collocated with the electromechanical actuator.

* * * * *